United States Patent [19]
Yamanaka

[11] 3,733,987
[45] May 22, 1973

[54] DEVICE FOR FIRING FLASHLAMPS IN CAMERA

[75] Inventor: Akira Yamanaka, Sakai, Japan

[73] Assignee: Minolta Camera Kabushiki Kaisha, Osaka, Japan

[22] Filed: June 23, 1971

[21] Appl. No.: 155,743

[52] U.S. Cl. ............... 95/11.5 R, 95/11 L, 95/10 C, 240/1.3
[51] Int. Cl. ............................................. G03b 15/04
[58] Field of Search ............... 95/11 R, 11 L, 11.5 R, 95/10 C; 240/1.3; 431/92, 93

[56] References Cited

UNITED STATES PATENTS

| | | | |
|---|---|---|---|
| 3,646,864 | 3/1972 | Hochreiter | 95/11.5 R |
| 3,602,120 | 8/1971 | Galbraith | 95/11.5 |
| 887,021 | 4/1970 | Pickering et al. | 95/11 L |
| 3,589,849 | 6/1971 | Sturm | 431/93 |
| 3,406,620 | 10/1968 | Hochreiter et al. | 95/10 C |

Primary Examiner—Robert P. Greiner
Attorney—Stanley Wolder

[57] ABSTRACT

A device comprises a changeover member disposed in operative relation to a shutter release member and adapted for a varying amount of movement in accordance with the need for flash photography, a detecting member whose operation is limited by the changeover member when a flash exposure is unnecessary and which detects the presence or absence of a striking member for firing a flashlamp when a flash exposure is required, and a locking member for interrupting the movement of the shutter release member in operative relation to the action of the detecting member when the detecting member detects that the striking member is not present at a predetermined tensioned position. Thus, when a flash picture is to be taken, the device prevents an exposure making operation which would otherwise be effected without firing of the flashlamp.

15 Claims, 6 Drawing Figures

INVENTOR
AKIRA YAMANAKA
BY
ATTORNEY

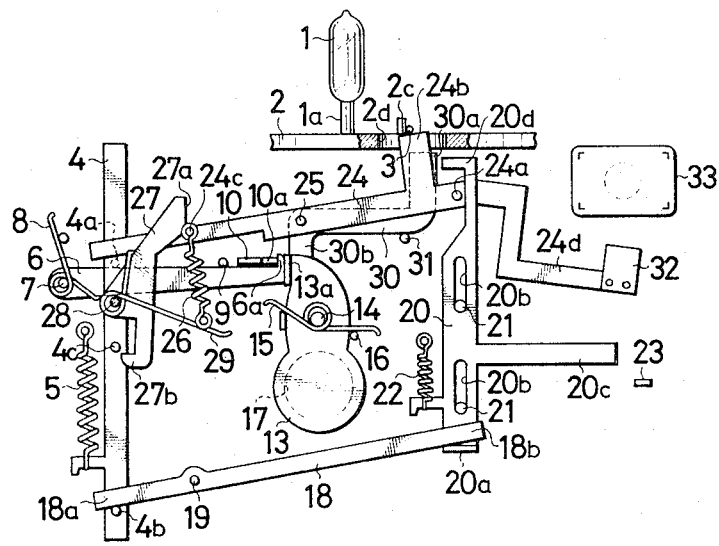

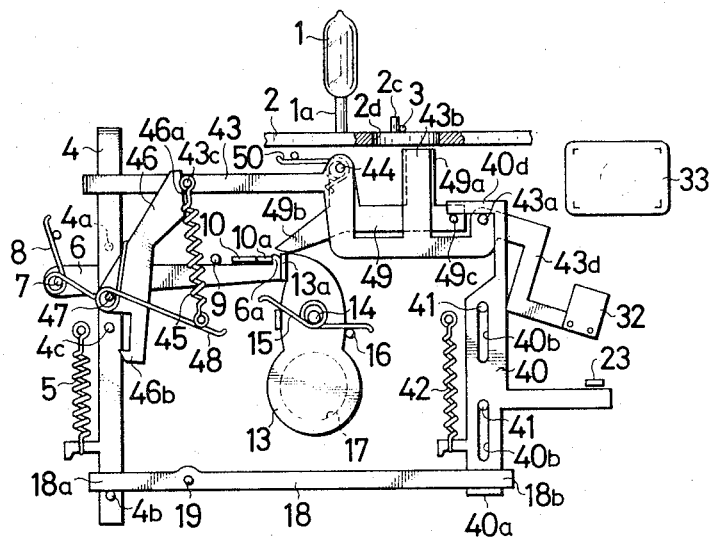

DEVICE FOR FIRING FLASHLAMPS IN CAMERA

BACKGROUND OF THE INVENTION

The present invention relates to a device for firing flashlamps in a camera, more particularly to a device in a camera for detecting whether a flashlamp can be fired or not.

Cameras have already been known which are to be equipped with a percussion-ignitable flashlamp or a flash unit incorporating a plurality of such flashlamps. With a camera of this type, the flashlamp is fired to take a flash picture by being struck on its leg in synchronism with the movement of the sector upon shutter release and, every time an exposure has been made, the flash unit is rotated a predetermined angle automatically or in operative relation to a shutter cocking operation to bring a fresh or unfired flashlamp to the front of the camera for the subsequent operation of taking a flash picture.

However, the camera such as described above has the drawback that even when a fired flashlamp is erroneously mounted or when all the flashlamps in a flash unit have been fired, the film will be exposed without firing of flashlamp in spite of the need for flash photography since a shutter release operation effects an exposure.

SUMMARY OF THE INVENTION

An object of this invention is to provide a device to be incorporated in a camera for use with a percussion-ignitable flashlamp or a flash unit including a plurality of such flashlamps for taking a flash picture, the device of this invention being so adapted as to detect whether the flashlamp mounted on the camera can be fired or not prior to the action of a member for actuating a striking member for firing the flashlamp in order to prevent a shutter release operation upon detecting that the flashlamp is not ignitable.

Another object of this invention is to provide a device for firing the flashlamp only when the need for a flash exposure is detected.

The device of this invention comprises a changeover member for taking a flash picture to be moved a varying amount in operative relationship to a shutter release member upon mechanically detecting the position of the pointer of exposure meter so as to judge the need for a flash exposure, a detecting member whose operation is limited by the changeover member when a flash exposure is unnecessary and which detects whether a striking member for firing a flashlamp is located at a predetermined tensioned position when a flash exposure is required, and a locking member operatively associated with the detecting member to be moved a varying amount in corresponding relation to the displacement of the detecting member, the locking member being adapted to interrupt the action of the release member to be actuated upon by a shutter release operation when the detecting member detects that the striking member is not located at the predetermined tensioned position.

The striking member comprises a spring or the like retained at a predetermined position in tensioned state and strikes the flashlamp on its leg for firing by its spring force upon being freed from its tensioned position. If the flashlamp is an unfired one, the striking member is retained in its tensioned position and if it has already been fired, the striking member is not located at its tensioned position.

Accordingly, the detecting member detects whether the striking member is at the predetermined position or not, only when the changeover member for flash photography detects the need for a flash exposure, and when the detecting member detects that the striking member is at the predetermined tensioned position, the release member, free of the locking engagement by the locking member, effects a normal shutter release operation to permit the flashlamp to fire in synchronism with opening of the sector.

In accordance with this invention, a trigger member for actuating the striking member to fire the flashlamp upon shutter release is disposed in operative relation to a sector actuating member for opening the sector.

In the case where the trigger member is actuated every time the shutter is released, for example, when flash exposure is unnecessary with the resulting possibility of the flashlamp firing, there is provided a mechanism wherein the action of the trigger member is limited by the movement of the changeover member to cause the trigger member to follow the movement of the sector actuating member and thereby trigger the striking member only when a flash exposure is necessary and possible.

Thus, in accordance with this invention, only when flash photography is required and a flashlamp or that in a flash unit on the camera is ignitable, the flashlamp is fired to prevent any faulty photographing operation by flashlight.

Other objects and characteristics of this invention will become more apparent from the following description.

BRIEF DESCRIPTION OF THE DRAWING

FIG. 3 is a front view of the same the moment when a detecting member detects upon the action of a shutter release member that a striking member is in a predetermined tensioned position;

FIG. 4 is a view of the same wherein the action of the shutter release member is interrupted upon the detecting member detecting that the striking member is not located at the predetermined tensioned position;

FIG. 5 is a front view of another embodiment of this invention wherein the action of a trigger member is limited by the movement of a changeover member to cause the trigger member to follow the movement of a sector actuating member and thereby fire a flashlamp only when a flash exposure is required; and FIG. 6 is a front view of the same when the shutter release member is initiated into operation.

DESCRIPTION OF THE PREFERRED EMBODIMENTS

Figure 1:
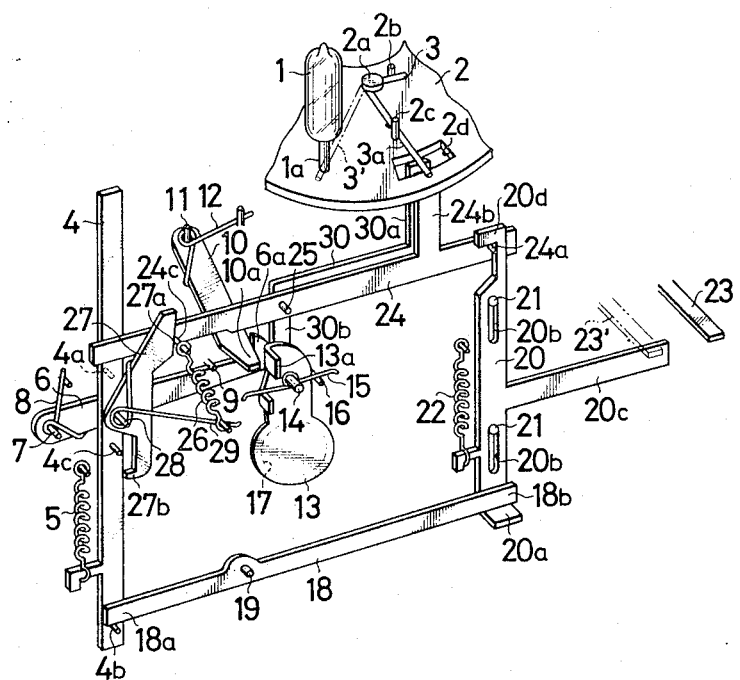
FIG. 1 is a perspective view showing the principal structure of an embodiment of this invention.

A flashlamp 1 has in its leg 1a a firing element for firing the lamp 1 when struck thereon and is seated on a mounting base 2 by its leg 1a. Disposed on the mounting base 2 is a striking member 3 made of a strong spring wire, with part of the striking member wound on a pin 2a on the mounting base 2. The fixed end of the striking member 3 is in engagement with a retainer pin 2b and a suitable portion of the free end 3a thereof is caught by a pin 2c. Thus the striking member 3 is in compressed state. As will be described later, the striking member 3 hits the flashlamp 1 on its leg 1a to fire the same under the spring force thereof when disengaged from the pin 2c as indicated in a phantom line 3' in FIG. 1. Under the free end 3a of the striking member 3, the mounting base 2 is formed with a window 2d for permitting entrance of members in the main body of the camera.

The mounting base 2 may serve as a base plate of a flash unit. In the case of a flash unit incorporating therein a plurality of flashlamps, the unit is rotatably and detachable mounted on the main body (not shown) of the camera, with a plurality of flashlamps 1 spaced apart equidistantly along a circumference having a center at a rotary shaft (not shown) of the mounting base 2. The striking members 3 and windows 2d are identical with the flashlamps 1 in number and so arranged as illustrated. When the flashlamps 1 have not been fired, the striking members 3 are all retained in the tensioned position. Every time a flashlamp 1 is fired, the mounting base 2 is rotated automatically or in operative relation to a shutter cocking operation to position an unfired flashlamp at the front of the camera.

Under the action of a return spring 5, a release member 4 is urged upward in the drawing and pushed down by a shutter release operation.

A latch 6 for retaining a sector actuating member 10 in its tensioned position by a hook 6a at its front end is pivoted at 7 in the interior of the camera body and is urged in a counterclockwise direction in the drawing by a spring 8, the position of the latch 6 being determined by a stopper pin 9. The latch 6 is turned clockwise by a pin 4a projecting from the rear face of the release member 4 when the member 4 is moved downward to permit the hook 6a to release the sector actuating member 10.

The sector actuating 10 pivoted at 11 is urged in a counterclockwise direction in the drawing by a spring 12 and moved in the already known manner by an unillustrated member upon a shutter cocking operation. At the cocked position shown, the actuating member 10 is arrested at its front end 10a by the hook 6a of the latch 6. When released from the latch 6 upon shutter release, the actuating member rotates in a counterclockwise direction under the action of the spring 12, permitting the front end 10a to drive the sector 13.

A sector 13 pivoted at 14 is urged in a counterclockwise direction in the drawing by a spring 15 and retained at the position to close the aperture 17 of the shutter by a stopper pin 16. The counterclockwise rotation of the actuating member 10 due to the action of the spring 12 upon disengagement from the latch 6 causes the front end 10a thereof to push the driven portion 13a of the sector 13 and drive the sector 13 in a clockwise direction to open the aperture 17 of the shutter. Further counterclockwise rotation of the actuating member 10 permits the front end 10a to pass over the driven portion 13a of the sector 13 and thereby disengage the same, whereupon the sector 13 is turned counterclockwise by the spring 15 to close the aperture 17 of the shutter. When the sector actuating member 10 is rotated clockwise and brought to the latched position shown by a shutter cocking operation, the front end 10a thereof is pushed upward along the curved edge of the sector 13 behind its driven portion 13a and brought over the upper portion of the sector 13 to the tensioned position shown in the drawing.

The mounting means for flashlamp 1 already known in the art and shutter release mechanism and its operation of making an exposure without using flashlight have been described. The mechanism for firing flashlamps will now be described.

Disposed in engagement with a pin 4b on the front face of the release member 4 at its lower end is one end 18a of an interlocking member 18 which is pivoted at 19 in the manner of a balance, the other end 18b thereof being in engagement with a lug 20a at the lower end of a changeover member 20 for flash photography. The changeover member 20 is supported in vertically movable manner, with its slot 20b receiving therein a pin 21 within the camera body, and is urged upward by a spring 22. Extending sidewise from the changeover member 20 is an arm 20c for detecting the position of the pointer 23 of an exposure meter.

Figure 2:
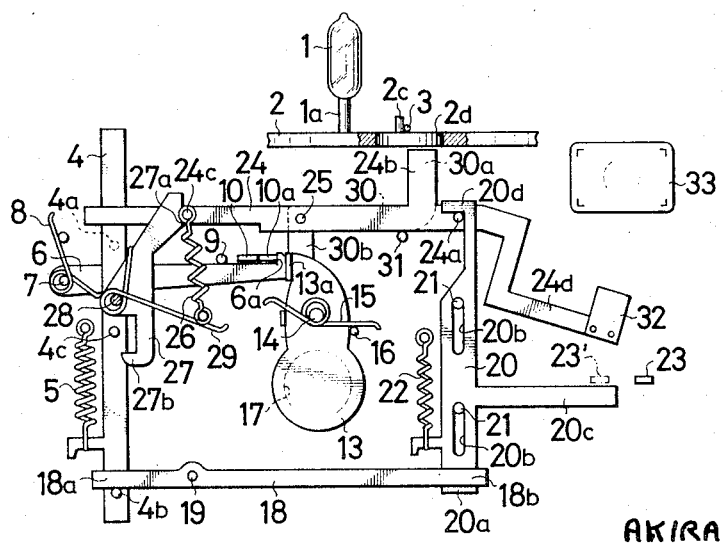
FIG. 2 is a front view of the embodiment of FIG. 1 with the shutter in the cocked position.

As already known, the pointer 23 is deflected depending upon the exposure conditions such as diaphragm aperture value of the camera, shutter speed, film speed, etc. and is located at the position indicated in a solid line in the drawing under the conditions wherein the subject is dark and use of flashlight is required, while it is located at the position of a phantom line 23' in FIGS. 1 and 2 where the subject is bright and a flash exposure is not necessary. Accordingly, the changeover member 20 detects the position of the pointer 23 with its arm 20c when moved upward. More specifically, when the pointer 23 is so positioned as indicated in the solid line (i.e., when a flash exposure is required,) the changeover member 20 is free to move upward without being interfered with by the pointer 23, but when the pointer 23 is at the position indicated by the phantom line 23' (i.e., when a flashlight exposure is not required), the arm 20c comes into contact with the pointer 23 and the changeover member 20 is therefore limited in its upward movement by the pointer 23 which is prevented from upward displacement by an unillustrated member.

The changeover member 20 for flash photography is further formed in its upper end with a hook 20d which is in engagement with a pin 24a at the tail end of a detecting member 24 for detecting whether the striking member 3 is located at a predetermined tensioned position or not, namely whether the flashlamp 1 is ignitable or not.

The detecting member 24 pivoted at 25 is urged in a counterclockwise direction in the drawing by a spring 26. Although the springs 22 and 26 act in the opposite relation to the action of the return spring 5 for the release member 4, the respective springs are such that the force of the return spring 5 is sufficiently greater than the total force of the springs 22 and 26.

The detecting member 24 is formed at its one side with an upwardly extending arm 24b whose upper end is positioned immediately under the window 2d of the mounting base 2 and, at the other side thereof, with a pin 24c in engagement with a cam portion 27a of a locking member 27. The upward movement of the changeover member 20, upon detection of the need for a flash exposure, permits the detecting member 24 to rotate in a counterclockwise direction under the action of the spring 26 and thereby project the upper end of the arm 24b into the window 2d so as to detect whether the striking member 3 is at the predetermined tensioned position or not.

If the striking member 3 is located at the predetermined tensioned position, the upper end of the arm 24b abuts the free end 3a of the striking member 3, whereupon the detecting member 24 is prevented from further counterclockwise rotation as shown in FIG. 3, whereas if the free end is not located at the predetermined position, the detecting member 24 will be rotated further in a counterclockwise direction as illustrated in FIG. 4.

On the other hand if the changeover member 20 detects from the presence of the pointer 23 that flash photography is unnecessary, the upward displacement of the member 20 will be smaller due to the interference by the pointer 23, with the result that the amount of the counterclockwise rotation of the detecting member 24 will be smaller because of the restriction by the hook 20d of the member 20, and the arm 24b will not enter the window 2d.

It is noted that the detecting member 24 detects the presence of the striking member 23 under the action of the spring 26 so that upon contact of the arm 24b with the free end 3a of the striking member 3, the spring 26 will exert its force on the free end 3a, but the striking member 3 will not be released by the spring force from the pin 2c which retains the striking member 3 at its tensioned position since the force of the spring 26 is sufficiently smaller than the spring force of the striking member 3.

The locking member 27 pivoted at 28 is urged in a clockwise in the drawing by a spring 29, with its cam portion 27a in contact with a pin 24c on the detecting member 24, and is formed at its lower end with a hook 27b in engageable relation to a pin 4c projecting from the release member 4.

When the changeover member 20 moves up detecting the need for a flash exposure upon depression of the release member 4, permitting the counterclockwise rotation of the detecting member 24, the position where the pin 24c on the detecting member 24 contacts the cam portion 27a of the locking member 27 shifts. If the detecting member 24 detects the striking member 3 located at the predetermined tensioned position at this time, the detecting member 24 is prevented from further rotation by the striking member 3 as shown in FIG. 3, so that the pin 24c on the detecting member 24 is kept in contact with the projecting cam portion 27a of the locking member 27 to prevent the locking member 27 from making a great pivotal movement. With the hook 27b of the locking member 27 thus retained away from the path of the pin 4c of the release member 4, the release member 4 is allowed to move further downward, which causes the pin 4a on its rear face to come into contact with the latch 6 and thereby rotate the same in a clockwise direction. The hook 6a therefore releases the sector actuating member 10, which in turn moves in a counterclockwise direction under the action of the spring 12 to drive the sector 13 for opening and closing of the shutter.

The sector actuating member 10 further actuates with its front end 10a trigger member 30 for triggering the striking member 3.

The trigger member 30 which is pivoted at 25 the same as the detecting member 24, has an arm 30a disposed immediately under the window 2d of the mounting base 2 in juxtaposed relation to the arm 24b of the detecting member 24 and an arm 30b extending downward to the path of front end 10a of the sector actuating member 10.

Accordingly, the counterclockwise rotation of the sector actuating member 10 pushes the arm 30b of the trigger member 30 to move the member 30 in a counterclockwise direction, permitting the arm 30a thereof to push up the free end 3a of the striking member 3 and thereby free the striking member 3 from its tensioned position where it is retained by the pin 2c, whereupon the striking member 3 forcefully strikes the flashlamp 1 on its leg 1a by its own spring force to fire the same.

The foregoing respective members are of course in such arrangement that the flashlamp 1 is fired in synchronism with the action of the shutter. Further the striking member 3 engages the pin 2c under a strong spring force of its own such that it will not be disengaged therefrom even when the arm 24b of the detecting member 24 hits the free end 3a thereof, but the spring 12 acting on the sector actuating member 10 has such force that the spring 12 causes the actuating member 10 to drive the sector 13 against the action of the spring 15 and to release the striking member 3 from the pin 2c against the engaging force of the striking member 3.

When relieved of the depression by a shutter release operation, the release member 4 returns upward under the action of the spring 5 causing the interlocking member 18, changeover member 20, detecting member 24, locking member 27 and latch 6 to return to the original position shown in FIG. 2. As already described, a shutter cocking operation brings the sector actuating member 10 to its tensioned position for engagement with the latch 6, while at the same time the trigger member 30 is returned to the position of FIG. 2 due to gravity and is supported by a stopper pin 31. In the case where the camera has mounted thereon a flash unit including a plurality of flashlamps, the mounting base 2 is rotated to bring an unfired flashlamp to the front of the camera.

The present device will further be described below with respect to its operation when the shutter is released after the flashlamp 1 has already been fired (i.e., when the striking member 3 is not in the predetermined tensioned position).

In operative relation to the downward movement of the release member 4 effected by a shutter release operation, the changeover member 20 for flash photography moves upward upon detecting the need for flash photography as shown in FIG. 4. The resulting counterclockwise rotation of the detecting member 24 due to the spring 26 permits the arm 24b thereof to advance into the window 2d of the mounting base 2. Since the flashlamp 1 has been fired and the striking member 3 is not located at the predetermined tensioned position, the detecting member 24 is free to make a greater rotation as compared with the case in FIG. 3 already described, with the result that the pin 24c is brought into contact with the recess in the cam portion 27a of the locking member 27, which in turn rotates clockwise under the action of the spring 29 allowing the hook 27b to position in the path of pin 4c of the release member 4 for engagement with the pin 4c so as to prevent the release member 4 from further downward movement. Thus the release member 4 is blocked in the course of its movement. As a result, the pin 4a extending from the rear face of the release member 4 will not press the latch 6 and the sector actuating member 10 remains arrested at the tensioned position by the hook 6a of the latch 6 without moving the sector 13. The trigger member 30 is also left intact.

Accordingly, the flashlamp 1 will then be replaced with a fresh, unfired one or a fresh flash unit will be mounted on the camera to make an exposure again. Thus, the present device serves to eliminate a failure such as an exposure making operation effected without firing a flashlamp where flash photography is required.

Secured to the extension 24d of the detecting member 24 is an indicator 32 for indicating and warning that the camera is not ready for flash photography, the indicator 32 being adapted to appear in the finder field 33 by the action of the detecting member 24 as shown in FIG. 4 if the flashlamp 1 is a fired one or a flashlamp is not mounted on the camera in taking a flash photograph. Alternatively, such indication may be provided by some other suitable means for warning as by lighting a red lamp attached to a suitable portion of the camera. When the camera is ready for a flash exposure or for usual photographing operation without firing the flashlamp, the indicator 32 will not appear in the finder field 33 since the rotational displacement of the detecting member 24 is small.

It will be seen that if the subject is bright and it is not necessary to use flashlight, the small upward displacement of the changeover member 20 due to the limitation by the pointer of exposure meter further restricts pivotal movement of the detecting member 24, so that the release member 4 is free to move downward without being blocked by the locking member 27 for a usual shutter release operation. In accordance with the embodiments of FIGS. 1 to 4, the arm 30b of trigger member 30 is positioned in the path of the front end 10a of the sector actuating member 10 all the time, with the result that every time the sector actuating member 10 is moved upon shutter release, the arm 30a of the trigger member 30 will be projected above the upper face of the camera to fire a flashlamp if it is mounted on the camera notwithstanding that flashlight is unnecessary. For this reason, with the foregoing embodiments, the flashlamp has to be removed from the camera if the subject is bright and flashlight is not required.

In order to eliminate such inconvenience, there is provided means as shown in FIG. 5 and 6, wherein the same members as those in FIGS. 1 to 4 are referred to by the same reference numerals and characters.

A changeover member 40 for flash photography is urged upward by a spring 42, with its slot 40b receiving therein a pin 41 within the camera body and has a lug 40a at its lower end in engagement with the end 18b of the interlocking member 18, the changeover member 40 thus being adapted for upward movement in operative relation with the depression of the release member 4, permitting the arm 40c thereof to detect the position of the pointer 23 of exposure meter. When the subject is bright and flashlight is not necessary, upward movement of the changeover member 40 is limited by the pointer 23 as shown in FIG. 5, while when a flash exposure is required, the member 40 is movable a greater amount because the pointer 23 is so positioned as shown in FIG. 6.

A detecting member 43 pivoted at 44 is urged in a counterclockwise direction by a spring 45 and has a pin 43a engaged by a hook 40d at the upper end of the changeover member 40 and an upwardly extending arm 43b positioned immediately below the window 2d of the mounting base 2. Upon detecting that flash photography is unnecessary, the changeover member 40 limits the counterclockwise rotation of the detecting member 43 and upon detecting the need for flash photography, the changeover member 40 permits the detecting member 43 to move counterclockwise free of the limitation. The arm 43b therefore detects whether the striking member 3 is located at a predetermined tensioned position or not, with the result that if the flashlamp has not been fired, the striking member 3 prevents the detecting member 43 from further counterclockwise rotation, while if the flashlamp 1 has already been fired, the detecting member 43 rotates a greater amount, permitting a locking member 46 in contact with the pin 43c on the member 43 to move pivotally a great amount. The detecting member 43 is further provided on its extension 43d with an indicator which is introduced into the finder field 33 when the flashlamp is one which has already been fired.

The locking member 46 pivoted at 47 is urged in a clockwise direction by a spring 48 and has a cam portion 46a in engagement with the pin 43c on the detecting member 43. When the amount of rotation of the detecting member 43 is small (i.e., when the detecting member detects that the flashlamp has not been fired and when flash photography is not required), the projecting cam portion 46a of the locking member 46 is in contact with the pin 43c to permit the lower end hook 46b retracted from the path of pin 4c of the release member 4, the release member 4 thus being free to move down for shutter release.

Upon detecting that the flashlamp has already been fired on the other hand, the detecting member 43 makes a great rotation causing the pin 43c to contact the recess in the cam portion 46a and permitting the locking member 46 to make a great rotation under the action of the spring 48. Consequently, the hook 46b is brought to the path of pin 4c on the release member 4 for engagement with the pin 4c so as to stop the release member 4 in the course of its downward movement and to thereby block an exposure making operation.

In this way the respective members 40, 43, 46 perform the same operation as the members 20, 24, 27 in FIGS. 1 to 4. The embodiment of FIGS. 5 and 6 includes an improved trigger member 49 which no longer requires the removal of the flashlamp irrespective of the photographing conditions.

The trigger member 49 pivoted at 44 the same as the detecting member 43 is urged in a counterclockwise direction by a spring 50 and has an upwardly extending arm 49a whose upper end is positioned immediately under the window 2d of the mounting base 2 in juxtaposed relation to the arm 43b of the detecting member 43 and an arm 49b to be pushed by the front end 10a of the sector actuating member 10 during flash photographing operation. The trigger member 49 further includes an extension implanted with a pin 49c adapted for engagement with the hook 40d at the upper end of the changeover member 40 under the action of the spring 50 so that when the flashlight is not used, namely when the changeover member 40 is limited in its upward movement by the pointer 23 of exposure meter, the arm 49b is retracted upward from the path of the front end 10a of the sector actuating member 10 as seen in FIG. 5, the arrangement further being such that when the changeover member 40 moves upward a great deal upon detecting the need for flash photography, the trigger member 49 is allowed to turn counterclockwise under the action of the spring 50 to position the arm 49b in the path of movement of the front end 10a of the sector actuating member 10 as illustrated in FIG. 6.

Thus if flash photography is unnecessary, a shutter release operation will not cause the sector actuating member 10 to rotate the trigger member 49, eliminating undesired firing of an unfired flashlamp mounted on the camera, but only when the changeover member 40 detects the need for use of flashlight, the trigger member 49 is shifted to the position where it is actuated in operative relation to the sector actuating member 10 to thereby fire the flashlamp synchronously with the opening of the shutter. In the case where the flashlamp has already been fired when there is the need for flash photography, the sector actuating member 10 remains arrested at its tensioned position as previously described.

What is claimed is:

1. In a camera including a shutter and equipped with a flash unit including a percussion-ignitable flashlamp and a striker element movable from a cocked to an uncocked position: a shutter release member movable between retracted and advanced positions;
   a shutter actuating member actuatable in response to the advance of said shutter release member;
   means for measuring the camera incident light movable between flash and non-flash positions in response to said incident light being below and above a predetermined value respectively and being operable upon advance of said shutter release member and prior to action of said shutter actuating member;
   a striker detecting means for detecting the position of said striker element movable in response to said light responsive means being in said flash position to positions responsive to the cocked and uncocked positions of said striker element;
   means responsive to said striker detecting means sensing said striker element in uncocked condition and to said light responsive means being in said flash position for locking said shutter release member in its retracted position; and
   a flash synchronizing means for releasing said striker element to fire said flashlamp in synchronism with opening of the shutter.

2. The camera as set forth in claim 1, comprising means for freeing said flash synchronizing means from the action of said shutter actuating member when flash photography is not required including means for retaining said flash synchronizing means at a position out of the path of said shutter actuating member.

3. The camera as set forth in claim 1, wherein said striker detecting means includes an indicating member for indicating the camera ignition condition.

4. The camera as set forth in claim 3, comprising means for freeing said flash synchronizing means from the action of said shutter actuating member when flash photography is not required including means for retaining said flash synchronizing means at a position out of the path of said shutter actuating member.

5. The camera as set forth in claim 1, wherein said light measuring means includes an element movable in response to said incident light and a flash changeover member having a sensing member for sensing the position of said light responsive element member to operate in accordance with the brightness of an object, said flash changeover member being actuated in response to the actuation of said shutter release member and prior to the action of said shutter actuating member; and said striker detecting means being movable moves in response to the position of said flash changeover member when said light responsive element indicates an incident light level requiring flash photography and is stopped by said striker element in its cocked position.

6. The camera as set forth in claim 5, comprising means for freeing said flash synchronizing means from the action of said shutter actuating member when flash photography is not required including means for retaining said flash synchronizing means at a position out of the path of said shutter actuating member.

7. The camera as set forth in claim 5, wherein said striker detecting means includes an indicating member for indicating the camera flash condition.

8. The camera as set forth in claim 7, including means for arresting said flash synchronizing means by said flash changeover member at a position free of the action of said shutter actuating member when flash photography is not required.

9. In a camera including a shutter and equipped with a flash unit including a percussion-ignitable flashlamp and a striker element movable from a cocked to an uncocked position:
   a shutter release member movable between retracted and advanced positions;
   a shutter actuating member actuatable in response to the advance of said shutter release member;
   means for measuring the camera incident light movable between flash and non-flash positions in response to said incident light being below and above a predetermined value respectively and being operable upon advance of said shutter release member and prior to action of said shutter actuating member;
   a striker detecting means for detecting the position of said striker element movable in response to said light responsive means being in said flash position to positions responsive to the cocked and uncocked positions of said striker element;
   means responsive to said striker detecting means sensing said striker element in uncocked condition and to said light responsive means sensing ambient light below said predetermined level for visually indicating the camera flash condition; and
   a flash synchronizing means for releasing said striker element in relation to said shutter actuating member so as to fire said flashlamp in synchronism with opening of the shutter.

10. The camera as set forth in claim 9, comprising means for freeing said flash synchronizing means from the action of said shutter actuating member when flash photography is not required including means for retaining said flash synchronizing means at a position out of the path of said shutter actuating member.

11. The camera as set forth in claim 9, including means for locking said shutter release member in its retracted position when said striker detecting means senses said striker element in uncocked condition.

12. The camera as set forth in claim 11, including means for arresting said flash synchronizing means by said flash changeover member at a position free of the action of said shutter actuating member when flash photography is not required.

13. In a camera including a shutter and equipped with a flash unit including a percussion ignitable flash lamp and a striker element movable from a cocked to an uncocked position, first means transferable between flash and nonflash conditions in response to the light incident on said camera being respectively below and above a predetermined value, second means for detecting the position of said striker element and transferable between cocked and uncocked indicating conditions in response to the cocked and uncocked positions respectively of said striker element, and third means for preventing the actuation of said shutter in response to said first and second means being in said flash and uncocked conditions respectively.

14. The camera of claim 13 including means for disabling said second means in response to said first means being in a nonflash condition.

15. The camera of claim 14 including a shutter release member movable between a retracted and an advanced position, a shutter actuating member responsive to the advance of said shutter release member and means responsive to the partial advance of said shutter release member for actuating said first means prior to the actuation of said shutter actuating member.

* * * * *